Patented Feb. 13, 1951

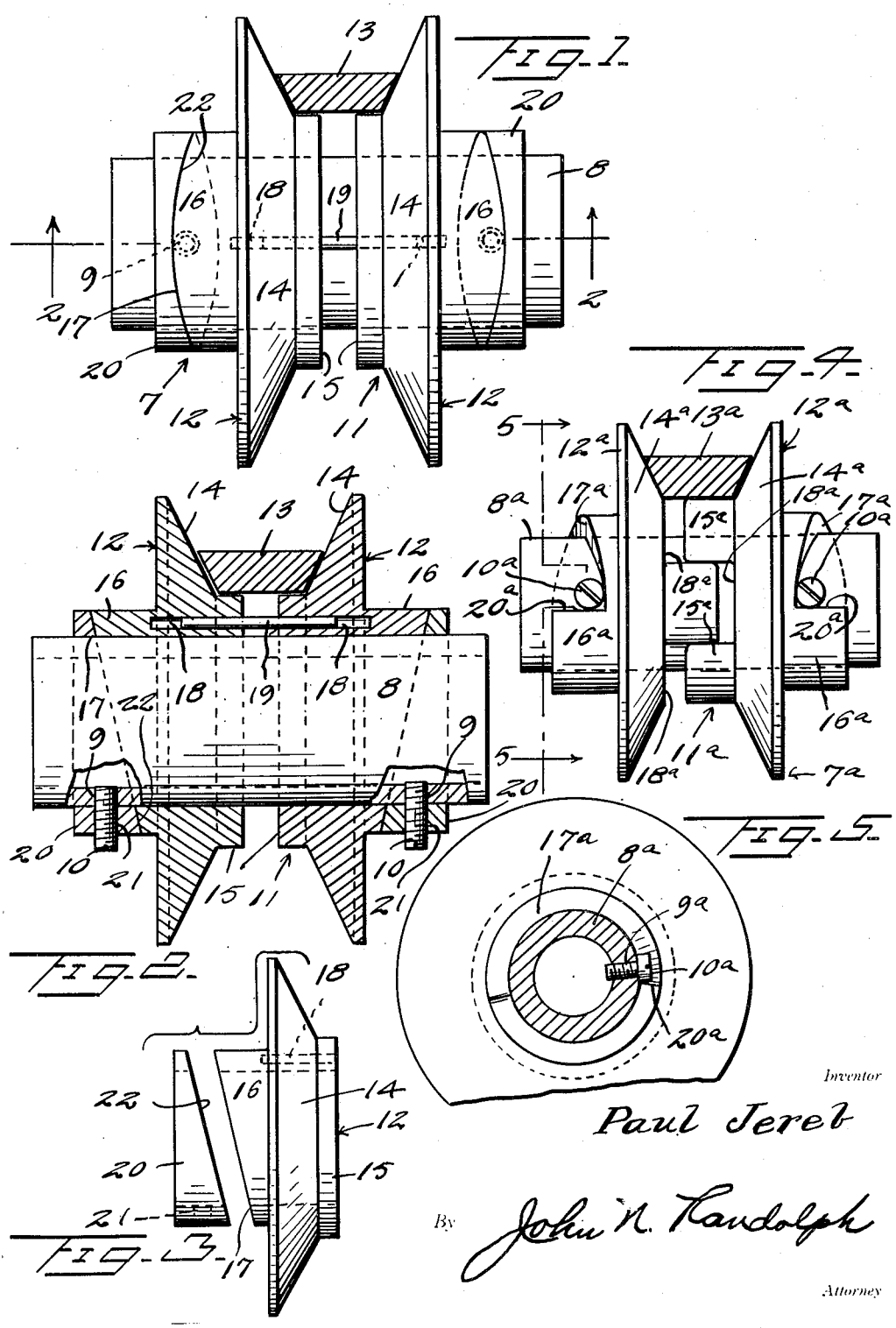

2,541,766

UNITED STATES PATENT OFFICE 2,541,766

AUTOMATIC BELT TAKE-UP PULLEY

Paul Jereb, Oakland, Calif.

Application November 25, 1949, Serial No. 129,471

7 Claims. (Cl. 74—230.24)

This invention relates to a novel construction of pulley having means for automatically tensioning a belt trained thereover and for gripping the opposite sides of the belt to minimize slippage thereby improving the life of the belt and reducing strain on the shafts connected by the belt.

Another object of the invention is to provide a novel belt pulley which permits V-belts of different widths to be utilized with the belt pulley.

Still another and particular important object of the present invention is to provide corresponding pulley halves or sections each of which may rotate in either direction relatively to a shaft on which the pulley is mounted and within a limited arc for causing said belt pulley sections to be displaced either toward or away from one another for properly accommodating the pulley halves to belts of different widths and for automatically taking up slack in a belt.

Still another object of the invention is to provide means for causing the two pulley halves to rotate relatively to their supporting shaft in unison.

Various other objects and advantages of the invention will hereinafter become more fully apparent from the following description of the drawing, illustrating preferred embodiments thereof, and wherein:

Figure 1 is a top plan view showing one embodiment of the invention and with the pulley halves thereof displaced away from one another;

Figure 2 is a sectional view taken substantially along a plane as indicated by the line 2—2 of Figure 1;

Figure 3 is an exploded side elevational view showing one pulley half and its associated cam member;

Figure 4 is a view similar to Figure 1 illustrating another embodiment of the invention, and Figure 5 is a cross sectional view taken substantially along a plane as indicated by the line 5—5 of Figure 4.

Referring more specifically to the drawing and first with reference to the form of the invention as illustrated in Figures 1, 2 and 3, the automatically adjustable belt pulley as disclosed therein is designated generally 7 and includes a belt pulley mounting which is illustrated as a sleeve 8 which is provided with longitudinally spaced longitudinally aligned threaded openings 9 for receiving screws 10. The sleeve 8 is adapted to be mounted on either a motor or other drive shaft or on a driven shaft and the screws 10 may be advanced into the bore thereof for securing the sleeve 8 to said shaft, not shown, for causing said sleeve to be revolved with the shaft. However, if desired, the belt pulley, hereinafter to be described, may be mounted directly on a drive shaft or driven shaft and the sleeve 8 may be assumed to represent a portion of said shaft.

The belt pulley, designated generally 11 includes corresponding pulley halves or sections, each designated generally 12 and which are adapted to engage a belt of V-shaped cross section, as illustrated in cross section at 13 in Figures 1 and 2. The pulley halves 12 are provided with corresponding outwardly diverging sides 14 which are adapted to receive therebetween the opposite, outwardly diverging sides of the V-belt 13. The pulley sections 12 each include an inner hub portion 15 which hub portions extend from the inner portions of the faces 14 toward one another. The pulley halves 12 are likewise each provided with an outwardly projecting hub portion 16 and said hub portions 16 are provided with corresponding outer ends or faces 17 which are disposed diagonally to the longitudinal axis or plane of the pulley halves 12 and to the axis of the sleeve 8.

The pulley halves 12 are provided with corresponding bores or recesses 18 which extend parallel to the axis of the sleeve 8 and which are disposed in corresponding relationship to the outer hub portions 16. A pin 19 has its end slidably disposed in the recesses 18 for connecting the pulley halves 12 to cause said pulley halves to turn in unison but which permit said pulley halves to slide toward or away from one another on the sleeve 8.

The pulley halves 12 are retained on the sleeve 8 between a pair of retaining collars 20 each having an opening 21 through which one of the screws 10 extends, so that the collars 20 are secured to the sleeve 8 by said screws 10. The collars 20 additionally function as cam members and have corresponding inner faces 22 which are disposed at the same angle as the hub ends or faces 17 and which are adapted to be engaged by said hub faces. When the pulley halves 12 are disposed as seen in Figures 1 and 2 and with the faces 17 and 22 in flush abutting engagement, said pulley halves will be spaced a maximum distance from one another. Accordingly, when the pulley 11 is revolved either by the sleeve 8 being turned or by being driven by the belt 13, if the sleeve 8 is revolved or driven it will initially turn relatively to the pulley 11, due to the drag on the pulley caused by the belt 13, and as this occurs the collars 20 will be turned relatively to the outer hub portions 16 to cause the widest part of each collar to move toward the widest part of the adjacent hub portion 16 to thereby through a camming action displace the pulley halves 12 uniformly toward one another for gripping the belt between the pulley faces 14 to cause said belt to be driven and if any slack exists in the belt for displacing the belt radially toward the periphery of the pulley 11 to thereby tension the belt. It will be readily apparent that this will occur irrespective of which direction the sleeve 8 and collars 20 are revolved relatively to the pulley 11 for thus automatically tensioning the belt 13 and for causing the pulley to properly grip the belt to prevent or at least minimize slippage between the belt and pulley and therefore reduce wear. Likewise, if the belt 13 is driven it will initially cause the pulley 11 to turn relatively to the sleeve 8 and collars 20 for similarly displacing the pulley halves toward one another, due to the drag or resistance to rotation offered by the sleeve 8 and the shaft to which it is connected. Obviously, the spacing between the collars 20 may be varied by adjusting the distance between the openings 9 or by providing additional openings 9 for varying the space between the pulley halves 12 to thereby accommodate the pulley 11 to belts of different widths.

Figures 4 and 5 illustrate another embodiment of the automatic belt tensioning pulley, designated generally 7a and which likewise includes a pulley mounting means which may be formed by a sleeve 8a, which is adapted to be mounted and secured to a driving or driven shaft or which may constitute a part of said shaft. As disclosed, the sleeve 8a is provided with longitudinally spaced longitudinally aligned threaded openings 9a each of which is adapted to receive the threaded shank of a headed stud 10a, the heads of which studs project from the periphery of the sleeve 8a. The automatic adjusting pulley 11a includes corresponding pulley halves 12a having corresponding belt engaging faces 14a, corresponding to the faces 14 of the pulley 11. The pulley faces 14a similarly engage opposite sides of a V-belt 13a, corresponding to the V-belt 13. In lieu of the inner hub portions 15, the pulley halves 12a are provided with correspondingly circumferentially spaced hub portions 15a which extend inwardly thereof. The hub portions of the two pulley sections 12a are staggeredly arranged so that the hub portions or teeth 15a of each section 12a will fit into the recesses 18a of the other section 12a to provide a sliding interfitting engagement between the teeth 15a of the two pulley sections 12a to cause said pulley halves to turn in unison relatively to the sleeve 8a while permitting the pulley sections to slide forward and away from one another.

The pulley halves 12a are provided with corresponding outwardly extending external hub portions 16a the outer ends of which include spiral portions 17a which are similarly disposed and which recede toward the inner ends of the pulley halves 12a. The hub portions 16a are provided with shoulders 20a which extend longitudinally of the sleeve 8a and outwardly from the inner ends of the inwardly receding spiral portions 17a. The heads of the studs 10a normally abut the shoulders 20a and the adjacent portions of the spiral edges 17a. Accordingly, if the sleeve 8a is revolved counterclockwise as seen in Figure 5 it may initially turn relatively to the pulley 11a and in so doing the heads of the studs 10a will ride along the spiral surfaces 17a which thus form cam surfaces for causing the pulley halves 12a to be displaced toward one another as the sleeve 8a thus revolves relatively to the pulley or if the pulley is turned relatively to the sleeve 8a by the belt 13a and in a clockwise direction as seen in Figure 5, the pulley halves 12a will be similarly displaced toward one another for gripping engagement with the belt 13a and to displace said belt 13a radially outwardly of the pulley for tensioning the belt. However, the automatically adjustable belt pulley 10a will not function if the sleeve 8a is driven in a clockwise direction as seen in Figure 5 or if the pulley 11a is driven by the belt in a counterclockwise direction as seen in Figure 5.

Various modifications and changes are contemplated and may obviously be resorted to, without departing from the spirit or scope of the invention as hereinafter defined by the appended claims.

I claim as my invention:

1. An automatically adjustable belt pulley comprising a pulley mounting member, a belt pulley formed of corresponding pulley halves rotatably mounted on said mounting member, each of said pulley halves having an inclined belt pulley engaging face, said belt pulley engaging faces being disposed in outwardly diverging relationship in a direction radially of the belt pulley, each of said pulley halves having an external outwardly extending hub portion provided with a cam surface at its outer end disposed at an angle to the plane of the belt pulley, and a pair of stop members secured to the pulley mounting member and between which the belt pulley is disposed, said stop members being engaged by the cam surfaces for causing the pulley halves to be displaced toward one another when the mounting member is turned relatively to the belt pulley or the belt pulley is revolved relatively to the mounting member.

2. An automatically adjustable belt pulley as in claim 1, and means slidably connected to each of said pulley halves for causing the pulley halves to revolve in unison.

3. An automatically adjustable belt pulley as in claim 1, said pulley halves having correspondingly disposed inwardly opening recesses, and a pin having its ends slidably engaging each of said recesses.

4. An automatically adjustable belt pulley as in claim 1, said stop members each comprising a collar secured to the mounting member and having an inner side tapered from one portion of the periphery thereof to its diametrical opposite peripheral portion, said tapered inner sides of the collars engaging said cam surfaces.

5. An automatically adjustable belt pulley as in claim 1, said stop members each comprising a collar secured to the mounting member and having an inner side tapered from one portion of the periphery thereof to its diametrical opposite peripheral portion, said tapered inner sides of the collars engaging said cam surfaces, and said cam surfaces each comprising a correspondingly tapered outer end.

6. An automatically adjustable belt pulley as in claim 1, said cam surfaces each including a spiral portion constituting less than a complete convolution and forming a part of the outer end of each exterior hub portion, each of said hub portions having a shoulder disposed longitudinally of the belt pulley and merging with the inner ends of said spiral cam surface, and said stop members including headed studs between which the belt pulley is disposed, the heads of said studs engaging said spiral cam surfaces for displacing the pulley halves toward one another when the mounting member is turned in one direction relatively to the pulley or said pulley is revolved in one direction relatively to the mounting member.

7. An automatically adjustable belt pulley as in claim 1, said belt pulley halves having corresponding inwardly extending circumferentially spaced hub portions, the hub portions of the two pulley halves being staggeredly arranged for interfitting engagement for slidably connecting the pulley halves for reciprocating movement toward and away from one another and for rotary movement as a unit.

PAUL JEREB.

No references cited.